United States Defensive Publication [19] (H) [11] T967,001

Brown et al. [43] Feb. 7, 1978

[54] AUSTENITIC Ni—Fe BASE WELD MATERIAL

[75] Inventors: Robert S. Brown, Leesport; Joseph B. Koch, Sinking Spring, both of Pa.

[73] Assignee: Carpenter Technology Corporation, Reading, Pa.

[21] Appl. No.: 791,786

[22] Filed: Apr. 28, 1977

[51] Int. Cl.[2] ..... C22C 30/02

[52] U.S. Cl. ..... 75/122; 75/134 C; 75/134 F; 219/146.23; 228/263

[57] ABSTRACT

Weld-filler material particularly useful in providing enhanced freedom from weld cracking in fully austenitic Fe—Ni—Cr—Mo—Cu material in which the elements P, Cb, Ce+La, C, Si, S, N and O are controlled to low levels and in which the level of manganese is increased to at least 1% and preferably to at least 1.5%. The weld-filler material in weight percent contains:

Carbon — 0.035 Max.
Manganese — 1–4.0
Silicon — 0.20 Max.
Phosphorus — 0.020 Max.
Sulfur — 0.005 Max.
Chromium — 19.0 –26.0
Nickel — 32.5–38
Molybdenum — 2–9
Copper — 3.0–4.0
Columbium — 0.35 Max.
Cerium — 0.01 Max.
Boron — 0.0035 Max.

the balance being iron and in which cerium includes cerium plus lanthanum or misch metal.

14 Claims, No Sheets Drawing,

11 Pages Specification

The file of this unexamined application may be inspected and copies thereof may be purchased (849 O.G. 1221, Apr. 9, 1968).